No. 887,133. PATENTED MAY 12, 1908.
M. E. SMITH.
SPEEDING CART.
APPLICATION FILED AUG. 31, 1907.

Witnesses
Inventor
Merton E. Smith
By
Attorneys

THE NORRIS PETERS CO., WASHINGTON, D. C.

UNITED STATES PATENT OFFICE.

MERTON E. SMITH, OF BRONSON, MICHIGAN.

SPEEDING-CART.

No. 887,133.

Specification of Letters Patent.

Patented May 12, 1908.

Application filed August 31, 1907. Serial No. 390,978.

*To all whom it may concern:*

Be it known that I, MERTON E. SMITH, a citizen of the United States, residing at Bronson, in the county of Branch and State of Michigan, have invented a new and useful Speed Cart or Sulky, of which the following is a specification.

This invention relates to speed carts or sulkies and has for its object to provide a strong, durable and thoroughly efficient cart of this character especially designed for use by horse trainers and other persons for speeding and breaking horses.

A further object of the invention is to provide a cart or sulky the guiding forks of which are connected by a rod or bar independent of the supporting frame so that should either wheel strike an obstruction or receive a jolt the other wheel will be correspondingly affected.

A further object is to provide a sulky in which the usual transverse axle is dispensed with, the entire weight of the vehicle being suspended from and supported by the wheel hubs.

A still further object of the invention is to generally improve this class of devices so as to increase their utility, durability and efficiency.

Further objects and advantages will appear in the following description, it being understood that various changes in form, proportions and minor details of construction may be resorted to within the scope of the appended claims.

Figure 1:
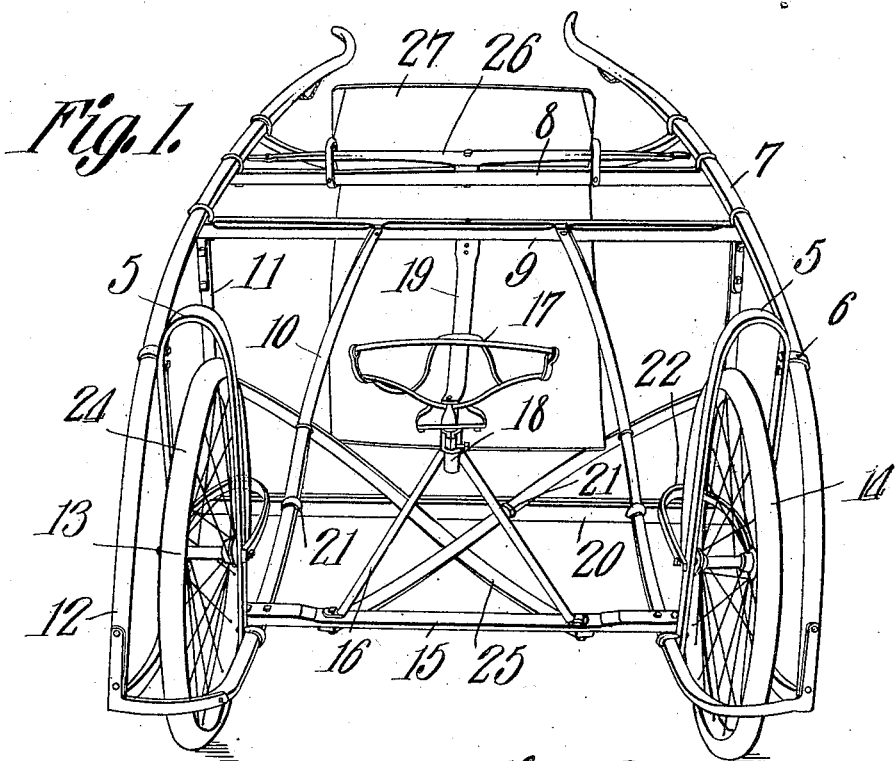
Figure 2:
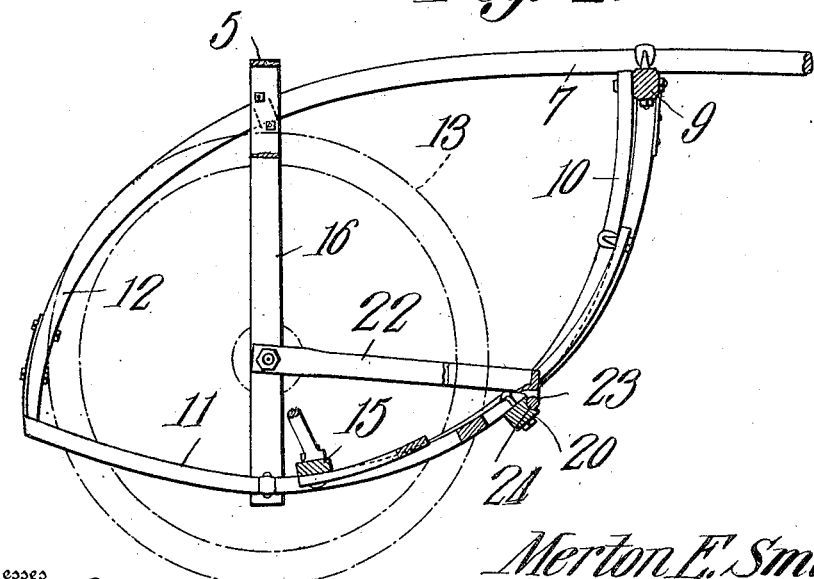

In the accompanying drawings forming a part of this specification: Figure 1 is a rear elevation of a speed cart or sulky constructed in accordance with my invention. Fig. 2 is a longitudinal sectional view of the same.

Similar numerals of reference indicate corresponding parts in all of the figures of the drawings.

The improved sulky forming the subject matter of the present invention includes a pair of spaced vertically disposed forks 5 to which are rigidly secured by clips or similar fastening devices 6 the shafts or thills 7, the latter being connected by spaced transverse bars 8 and 9.

The lower ends of the forks 5 are rigidly secured to downwardly and rearwardly curved bars 10 and 11 which are united at their rear ends and connected with the downwardly curved ends 12 of the thills, the opposite ends of said bars being spaced apart and rigidly secured to the adjacent transverse thill connecting bar 9. Extending transversely through the forks 5 are suitable stub shafts on which are mounted for rotation traction wheels 13 preferably provided with rubber tires 14. The inner curved bars 10 are connected by a transverse brace 15 to which are rigidly secured converging seat supporting bars 16 carrying a seat or saddle 17 of any approved construction. The seat post 18 is secured to the converging ends of the bars 16 and is also connected to the thill connecting bar 9 by means of a longitudinally disposed bar or brace 19.

Disposed in advance of the brace 15 is an auxiliary brace 20 which extends in front of the wheels 13 and is rigidly secured to the curved bars 10 and 11 by clips or similar fastening devices 21.

Mounted on the stub axles of the traction wheels and extending at substantially right angles to the vertical forks 5 are horizontally disposed guide forks 22 the closed ends of which are connected through the medium of a rod 23, the latter being independent of the frame and seated in a longitudinal groove 24 formed in the auxiliary brace 20, as shown. By connecting the closed ends of the forks 22 by the rod 23 and arranging the latter independently of the frame of the vehicle should either wheel strike an obstruction or receive a jolt the other wheel will be correspondingly affected. The frame of the vehicle is further reinforced and strengthened by the provision of diagonal bars 25 which extend from the brace 15 to the outer curved bars 11, the intermediate portions of said bars being rigidly connected with the auxiliary brace 20 and the inner curved bars 10, as shown. Pivotally mounted on the thill connecting brace 8 is a swingletree 26 and extending from a point in advance of the swingletree to the diagonal braces 25 is a guard or shield 27 formed of canvas, wood-veneer, slats or any other suitable material.

Attention is here called to the fact that in the present device the usual transverse axle is dispensed with, the entire weight of the vehicle being suspended from and supported by the hubs of the traction wheels.

Having thus described the invention what is claimed is:

1. A sulky including spaced wheel forks, thills secured to the forks, wheels journaled in said forks, substantially horizontal forks connected with the forks, a brace extending transversely of the frame and operatively connected with the thills, said brace being provided with a longitudinal seating groove, and a rod seated in said groove and connected with the horizontal forks.

2. A sulky comprising a frame including spaced wheel forks, thills secured to the forks, wheels journaled in said forks, substantially horizontal forks connected with the wheel forks, a brace extending transversely of the frame and operatively connected with the thills, and a rod connecting the horizontal forks and bearing against the brace, said rod being independent of the frame.

3. A sulky including spaced wheel forks, thills secured to the forks and connected by a transverse bar, rearwardly and downwardly curved bars secured to the transverse bar and fastened to the adjacent ends of the thills, wheels journaled in said forks, substantially horizontal forks secured to the wheel forks, and a rod connecting the horizontal forks.

4. A sulky including spaced wheel forks, thills secured to the forks and connected by a transverse bar, rearwardly and downwardly curved bars secured to the transverse bar and fastened to the adjacent ends of the thills, a transverse brace connecting the adjacent curved bars, a seat supported by the brace, wheels journaled in said forks, substantially horizontal forks connected with the wheel forks, and a rod connecting the closed ends of the horizontal forks.

5. A sulky including spaced wheel forks thills secured to the upper ends of the forks and having their rear ends curved downwardly, a transverse bar connecting the thills, spaced downwardly and rearwardly curved bars disposed on opposite sides of the vertical forks and having their upper ends spaced apart and secured to the thill connecting bar, and their lower ends united to the deflected ends of the thills, a transverse brace connecting the adjacent curved bars, wheels journaled in said forks, substantially horizontal forks secured to the wheel forks, and a rod connecting the horizontal forks.

6. A sulky including spaced wheel forks, thills secured to the forks and connected by a transverse bar, rearwardly and downwardly curved bars embracing the forks and having their upper ends secured to the transverse bar and their lower ends connected with the thills, a transverse brace connecting the adjacent curved bars, wheels journaled in said forks, substantially horizontal forks connected with the wheel forks, an auxiliary transverse brace secured to the curved bars, and a rod bearing against the auxiliary brace and connecting the horizontal forks.

7. A sulky including spaced wheel forks, thills secured to the closed ends of the forks and having their rear ends curved downwardly, a transverse bar connecting the thills, rearwardly and downwardly curved bars embracing the vertical forks and having their upper ends spaced apart and secured to the thill connecting bar and their lower ends united and fastened to the deflected ends of the thills, clips secured to the forks and embracing the curved bars, a transverse brace connecting the adjacent curved bars, wheels journaled in said forks, substantially horizontal forks connecting the wheel forks, an auxiliary brace disposed in advance of the wheels, a rod bearing against the auxiliary brace and connecting the horizontal forks, diagonal braces connected with the main and auxiliary braces and secured to the curved bars, and a seat supported by one of the transverse braces.

8. A sulky including spaced wheel forks, thills secured to the closed ends of the forks and having their rear ends deflected downwardly, a transverse bar connecting the thills, spaced bars connected with the lower ends of the forks and having their upper ends spaced apart and their lower ends united and connected with the deflected ends of the thills, stub shafts carried by the wheel forks, wheels mounted for rotation on the stub shafts, substantially horizontal forks secured to the ends of the stub shafts, a transverse brace connecting the adjacent curved bars, an auxiliary transverse brace disposed in advance of the wheels and having a longitudinal seating groove formed therein, a rod seated in said groove and connecting the horizontal forks, said rod being independent of the auxiliary brace, seat supporting posts secured to one of the transverse braces, a seat supported by the posts, and a longitudinal brace connecting the seat and thill connecting bar.

In testimony that I claim the foregoing as my own, I have hereto affixed my signature in the presence of two witnesses.

MERTON E. SMITH.

Witnesses:
  RELL D. STRANG,
  R. D. POWERS.